Nov. 22, 1960 F. J. TORTORELLA 2,961,527
PORTABLE SPOT WELDER

Filed June 4, 1958 2 Sheets-Sheet 1

INVENTOR.
FRANK J. TORTORELLA,
BY
Parker and Carter
ATTORNEYS.

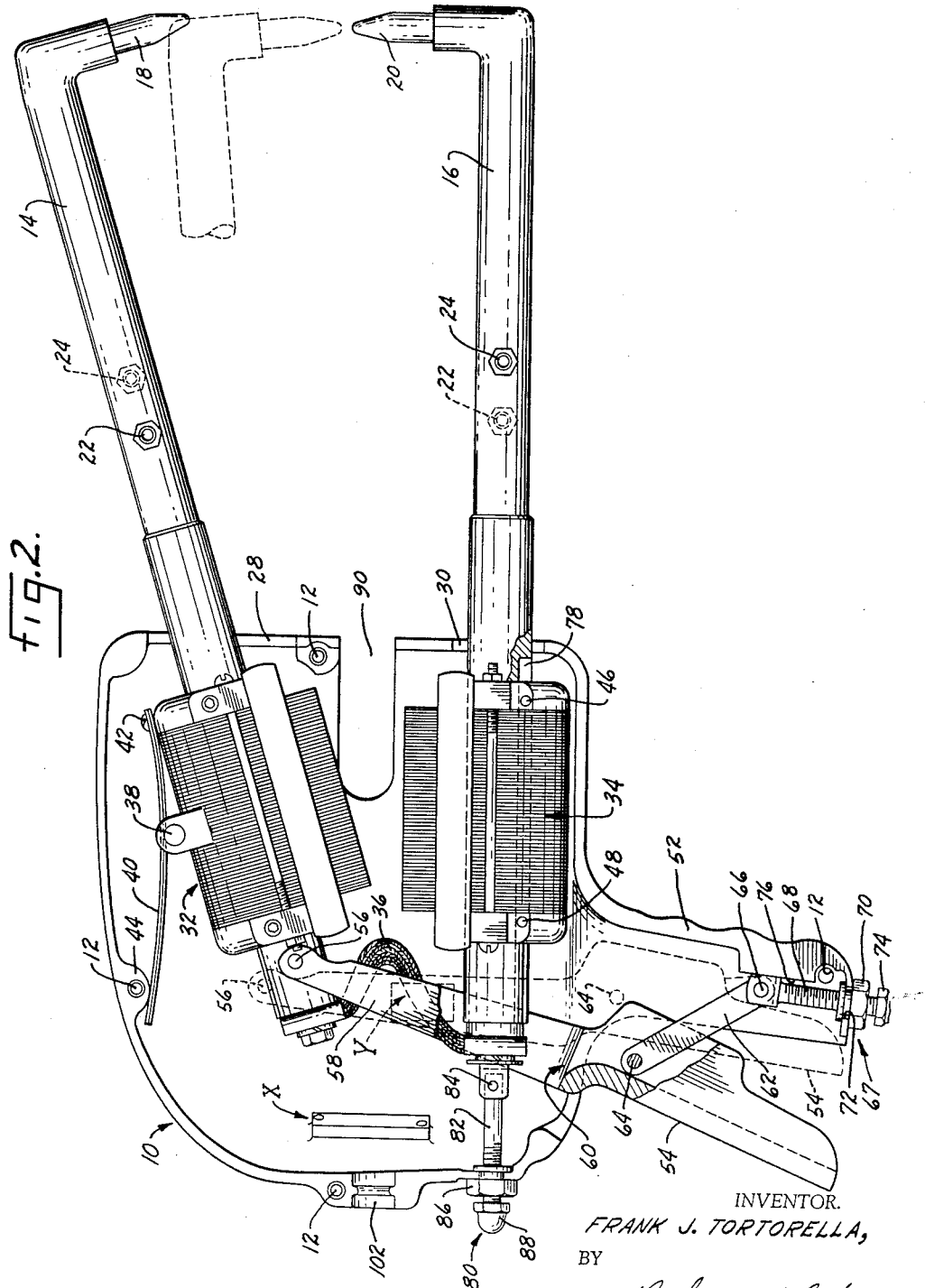

United States Patent Office 2,961,527
Patented Nov. 22, 1960

2,961,527

PORTABLE SPOT WELDER

Frank J. Tortorella, Park Ridge, Ill., assignor to The Merit Company, Chicago, Ill., a corporation of Illinois Filed June 4, 1958, Ser. No. 739,763

1 Claim. (Cl. 219—90)

This invention is in the field of portable welders or welding machines and is more specifically concerned with an improved portable welder or the like in which the tip pressure may be varied in use from one job to another without requiring extensive alteration of the unit other than a few minor simple manual adjustments. While this may be the major consideration, nevertheless, many of the inventive aspects, while derived from or coordinated with this underlying consideration, are nevertheless independently usable in this and other fields and are not necessarily restricted thereto.

A primary object of my invention is a portable spot welder or the like with an arrangement for adjusting the tip pressure.

Another object is a welder of the above type in which the adjustment may be made without any revision or alteration of the basic machine.

Another object is a portable welder which is compact and easily manually manipulated.

Another object is a portable welder with an adjustment so that the tips can always be made coincident when closed.

Another object is a portable welder which requires a minimum of maintenance and provides a maximum of serviceability.

Another object is a new and improved portable welder which may be either water or air cooled.

Other objects will appear from time to time in the ensuing specification and drawings in which:

Figure 2 is a side view, on an enlarged scale, with one half of the frame removed and parts in section.

Figure 1:
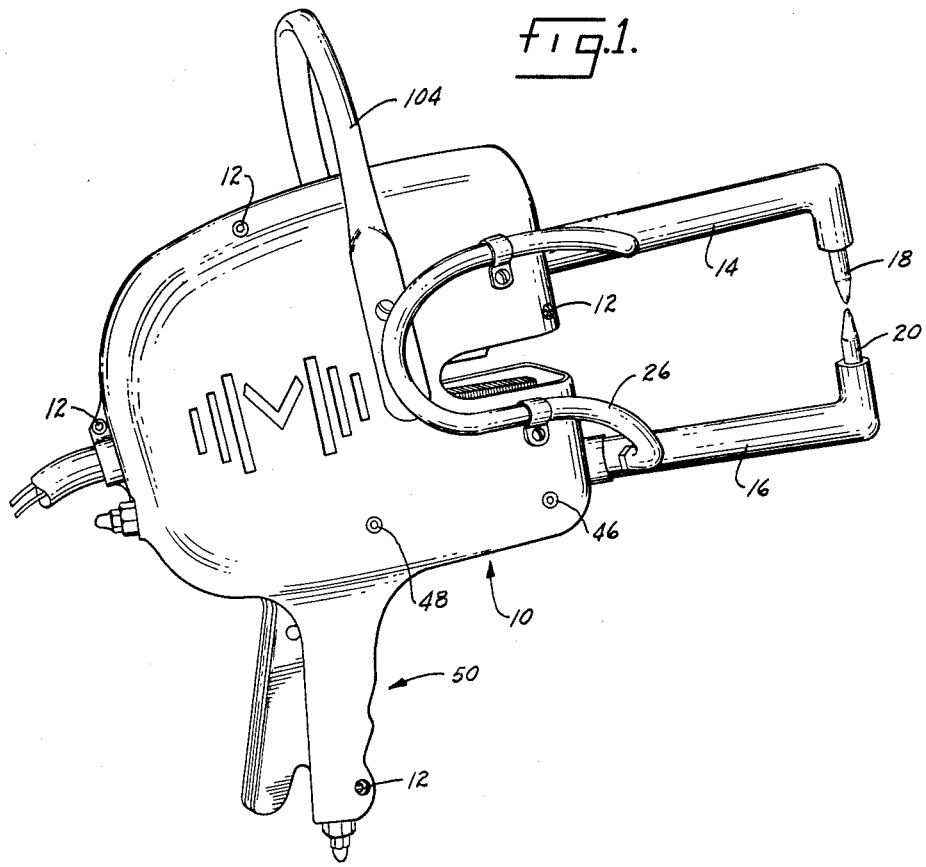
Figure 1 is a perspective of the welder.

In Figure 1 the welder has been shown as including a housing or frame indicated generally at 10 which may be composed of symmetric halves secured together by screws or the like or otherwise, the screws being indicated at 12 in Figure 1 and the screw holes at 12 in Figure 2. In Figure 2 one half of the housing or frame has been removed. A pair of welding arms, one above the other, extends from the housing, the upper arm being indicated at 14 and the lower arm at 16. At their outer ends, the arms turn inwardly and are provided with tips 18 and 20, respectively, each of which may be a standard No. 1 Morse taper tip or otherwise. I have not shown the insides of the arms; however, in the embodiment shown I intend that they be water-cooled. For example, the lower arm may have an inlet connection of any suitable type, as at 22, with an outlet connection 24 of any suitable type on the upper arm, the water jackets of the two arms being suitably interconnected by a hose or tube 26 so that one discharges into the other. But the details of the particular cooling structure for the arms is not important, and it should be understood that the arms may be either water or air cooled.

In Figure 2 it will be noted that the arms have their inner ends disposed within the housing and extend through suitable openings 28 and 30 in the front. The inner end of each arm within the housing is provided with a transformer, as at 32 and 34, disposed around each arm and constructed so that the coil of the transformer constitutes the primary and the arm itself within the transformer constitutes the secondary. The wires or leads to the transformers are connected so that the resulting fields created in the secondaries, the arms, are additive. The resulting field induces the welding current or circuit which is completed at one end by a suitable braid or cable 36 connected between the rear ends of the arms and at the other by the tips 18 and 20 contacting the metal to be welded.

The upper arm 14 has its transformer 32 pivotally mounted in the housing, the pivot being generally designated 38. A leaf spring 40 or the like may be suitably connected to the upper arm's transformer, as at 42, and engages the top of the housing, as at the boss 44. The spring biases the upper arm counterclockwise, in Figure 2, or to the "open position" of the tips shown in full lines in Figure 2. In broken lines the upper arm is shown in its lower or closed position where it is moved by a manually actuated means to be set forth in detail hereinafter. The detail or makeup of the transformer 32 is not important to this invention and, accordingly, will not be set forth.

The transformer 34 on the lower arm 16 supports the lower arm and is connected to the housing by four screws or the like, two forward at 46 and two rear at 48. In Figure 1 the heads of these screws projecting through the housing or frame are shown. It should be understood that two additional screws project from the other side of the frame in approximately the same location as in Figure 1 but are symmetrically opposite. Thus, the transformer is supported on all four corners, so to speak, two screws forward, one on each side, and two screws aft, one on each side. There is a degree of play or freedom or clearance between the sides of the transformer 34 and the inside of the housing so that by actuating the screws 46 and 48 the transformer, and the lower arm, may be shifted or adjusted slightly. The importance of this is that the tips 18 and 20 should come together or be coincident or directly aligned with each other during welding. But, as often occurs, the upper arm may be laterally misaligned so that the tip 18 will be slightly to one side or the other of the lower tip 20, when closed. In this case the screws 46 and 48 may be adjusted to laterally shift or pivot the lower arm to bring the lower tip 20 directly under the upper tip. For example, the two screws 46 and 48 on one side could be let out and the screws 46 and 48 on the other side taken in so that the entire arm could be shifted laterally. Or the forward screws 46 could be actuated to move the assembly slightly in one direction and the rear screws 48 could be actuated to move it slightly in the other direction, which would result in a lateral pivoting motion. The fit between the various parts, the screws, the transformer, the housing and the arm, is such that this slight movement, be it a shift or a pivot, may take place, it being understood that at no time is the misalignment of the tips so great so as to require major adjustment. This applies as well to the mechanism, as set forth hereinafter, for adjusting the lower arm axially or longitudinally.

In Figure 1 the housing or frame is provided with a grip, indicated generally at 50, made up primarily of two elements, one a fixed element 52 which may be an integral part of the housing, as shown in Figure 2. It will be understood that the fixed element 52 may be divided into symmetrical halves which conform to the halves of the housing. The other element 54 of the grip is movably mounted and is pivotally connected at its upper end at 56 to the upper arm to actuate it in a manner set forth hereinafter. The movable element 54 is in the form of a Y and has a forklike portion or yoke 58 rising on both sides of the rear end of both arms with the legs of the yoke coming together generally at 60. Thus, actuation of the movable element 54 does not cause it to contact the rear end of the lower arm in the closed position, such as shown in broken lines in Figure 2. The lower portion of the movable element 54 may be a channel-like member, as shown in Figure 2, and a link 62 may extend into the channel and be suitably pinned to a pivot at 64. The other end of the link may be pivoted at 66 to an adjusting mechanism 67. The pivot 66 is on the end of an adjustment screw 68 which is disposed generally upright in the fixed element 52. The screw 68 may be threaded through a nut 70 disposed in an opening 72 in the lower end of fixed element 52 and having flanges on both sides of the opening 72, as shown in Figure 2, so that it may be rotated. A captype lock nut 74 may be applied to the end of the screw. The screw 68 does not rotate since it is pivotally pinned to the link 62. But rotation of the nut 70 moves the screw axially to adjust the position of the pivot 66. The outside of the nut 70 may have a hex nut formation or otherwise to facilitate its rotation. The inside of the fixed element 52 may be provided with an abutting surface or shoulder 76 along which the pivot 66 is moved, either up or down.

It will be noted that by rotating the nut 70, the screw will be axially moved and, accordingly, the pivot 66 will be moved. This varies the effective throw of the linkage made up of link 62 and movable element 54. For example, if the pivot 66 is pushed up in the fixed element 52, and the linkage is actuated or the movable element 54 compressed to its broken line position in Figure 2, the pivot 56 at the upper end thereof will be in a higher position thereby depressing the tip 18 to a lower position. On the other hand, if the pivot 66 is lowered, the tip 18 will stop in a higher position.

The lower arm 16 is provided with a longitudinal slot 78 of a suitable length which fits in an appropriately formed key portion inside the transformer 34. The arm is relatively free so that it may be longitudinally adjusted and an adjusting mechanism 80 includes a screw 82 connected to the rear end of the arm at 84 and threaded through a nut 86 which may be the same as or similar to the nut 70. A suitable captype jam nut 88 may be provided on the outer end of the screw. By rotating the nut, the screw 82, which cannot rotate because it is keyed in the transformer 34, may be moved axially thereby extending or withdrawing the arm 18.

The two halves of the fixed portion 52 of the grip may form a rearwardly open channel so that when the movable element 54 is compressed, generally to the broken line position in Figure 2, it may slide in.

The forward part of the housing may be slotted on each side, as at 90, to provide for greater reach across the metal being welded.

Figure 3:
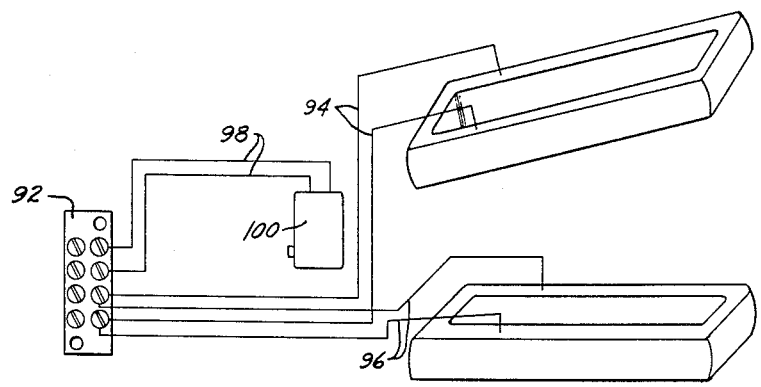
Figure 3 is a wiring diagram.

A wiring diagram is shown in Figure 3 and a terminal block 92, which may be mounted inside of the housing, indicated generally at X in Figure 2, may include a plurality of terminals. Suitable leads 94 and 96, in parallel, may run to the transformers and leads 98 to a microswitch 100 which may be located at Y in Figure 2 so as to be actuated by a suitable lug or the like, not shown, on the upper portion of the movable element 54 of the linkage. Thus, closing of the grip which causes forward movement of the upper portion of element 54 causes it to contact the microswitch and close it.

It should be noted in the broken line or closed position of the arms, the pivots 66, 64 and 56 of the linkage generally are aligned, and the linkage does not go over center. Because of their alignment, which in a sense is a dead center position, the operator does not have to apply excessive manual pressure to keep the tips closed, as the majority if not all of the force of the spring 40 will be exerted through the dead center pivots. They do not have to be precisely aligned but it should be close.

The unit is designed to operate on single phase 220 current which is supplied to the terminal block by suitable leads, not shown, which extend through a suitable opening 102 in the rear of the housing. But it might be otherwise.

I have not shown the various details of the housing as they may be old. For example, I may have suitable internal bosses or enlargements inside the housing for sockets for the pivots 38. I may also have suitable internal flanges or otherwise for supporting or mounting the various elements, be they movable or fixed, but these are not considered important in and of themselves and have not been shown.

The use, operation and function of my invention are as follows:

Be the welding arms air or liquid cooled, they should be adjustable so that the tips may be always coincident or aligned when in a closed position. By adjusting the posiiton of the lower pivot 66 in the hand grip, the final position of the upper tip on the upper arm in the closed position may be adjusted. If the pivot 66 is lowered, the tip will stop in its downward movement in a higher position and will actually be farther away from the housing than if the pivot 66 is raised causing the tip 18 to come down farther to the fully closed position. It will be noted in Figure 1 that the tip 18 is aligned generally in a horizontal plane with the pivot 38 about which it moves. When the linkage is actuated, the tip will move inward somewhat in addition to rotating down. The farther down it comes, the farther in it moves. Therefore, when the pivot 66 is raised causing the tip 18 to move down farther, it also causes it to swing in farther. Therefore, the lower tip 20 must be pulled back to maintain vertical alignment between them. This requires that the mechanism 80 be adjusted to withdraw the lower arm somewhat.

But if the pivot 66 is lowered, the upper tip will not come down as far and, accordingly, will not swing in as far. To maintain vertical alignment, the lower arm should be moved out by its adjusting mechanism 80.

The adjusting mechanism 80 has not bearing on the distance between the tips in their closed position; it merely maintains vertical alignment. Adjustment of the mechanism 67, however, either separates or closes the tips in their closed position and accordingly varies the tip pressure during welding.

Adjustment of the screws 46 and 48 that support the lower transformer and arm is effected to shift or pivot the lower arm laterally, which makes for a lateral alignment or coincidence of the tips.

I may provide a carrying strap 104 in Figure 1 which may be suitably connected to the outside of the housing in any suitable manner, but this is unimportant.

By adjusting the tip pressure in the manner described hereinabove, the unit may be made to handle various combined plate thicknesses and the pressure involved may be varied. The tip alignment may always be assured regardless of the pressure used.

While I have shown and described the preferred form and suggested several variations of my invention, it should be understood that suitable additional modifications, changes, substitutions and alterations may be made without departing from the invention's fundamental theme. I, therefore, wish that the invention be unrestricted except as by the appended claim.

I claim:

In a portable spot welder or the like, a frame, a pair of welding arms having welding tips at their outer ends mounted on and extending out of the frame for pivotal movement relative to each other to close and open the tips, the arms being disposed one above the other, the upper arm being pivoted and actuated by a manually operable linkage, means for varying the effective throw of the linkage when manually operated to adjust the tip approach, the lower arm being axially adjustable so that the distance of its tip from the housing may be selectively varied in accordance with the throw of the linkage for the upper arm when the tip approach is varied to assure tip alignment, and means for inducing a welding current in the arms.

References Cited in the file of this patent

UNITED STATES PATENTS

| | | |
|---|---|---|
| 2,441,438 | Mulder | May 11, 1948 |
| 2,464,054 | Panik | Mar. 8, 1949 |
| 2,747,063 | Waring | May 22, 1956 |
| 2,749,417 | Griskell | June 5, 1956 |